Aug. 29, 1961        H. RUEGER        2,997,840

BATTERY OPERATED TIME PIECE

Filed Dec. 12, 1958

INVENTOR
*Herman Rueger*

BY
*Diggins & LeBlanc*
ATTORNEYS

United States Patent Office 2,997,840
Patented Aug. 29, 1961

2,997,840
BATTERY OPERATED TIME PIECE
Herman Rueger, Lancaster, Pa., assignor to The Hamilton Watch Company, Lancaster, Pa., a corporation of Pennsylvania
Filed Dec. 12, 1958, Ser. No. 780,073
13 Claims. (Cl. 58—28)

This invention relates to a battery operated timepiece wherein the balance wheel serves as the driving element and in particular to the means for transmitting power from the balance staff to the indexing gears.

In assignee's Patent No. 2,662,366 to Fred Koehler there is shown an electric timepiece which utilizes the motion of the balance wheel and associated staff to drive an indexing gear which, in turn, drives the train of the watch. In order to effect this drive connection in a manner which will not detract from the isochronal characteristics of the movement resort is had to a drive connection utilizing a helical spring and two spring guide members, all of which must be mounted on the balance staff or attached to the balance wheel.

In assignee's Patent No. 2,777,279 also to Fred Koehler there is shown a further drive arrangement again utilizing a helical spring and a pair of cooperating spring guide elements all mounted on the balance staff or connected to the balance wheel.

According to the present invention it has now been found that an index gear drive connection of the foregoing type may be provided with a lesser number of parts than heretofore used and with a simple elongated spring rather than the helical spring which has been necessary. The reduction in the number of parts results in a reduction in assembly cost while the use of a simple spring lowers the cost of materials. According to the invention this achievement is secured by so shaping the spring in relation to the balance staff that the spring cooperates with the staff to retain itself in position while at the same time providing adequate resilience to carry out its indexing function.

Accordingly, it is a primary object of the present invention to provide a novel and inexpensive means of translating the oscillatory movement of a balance staff into intermittent rotary motion of an indexing gear.

It is another object of the present invention to provide an extremely simple translating device which will require a very small actuating force.

It is still another object of the present invention to provide a wear resistant device for translating the oscillatory movement of a balance staff into intermittent motion of an indexing gear.

These and further objects and advantages of the present invention shalle become more apparent upon reference to the following specification and claims and appended drawings wherein:

The type of time piece dealt with herein is shown in detail in the aforementioned Koehler Patent No. 2,662,366 and thus this specification will deal only with the improved indexing arrangement with which the instant invention is concerned. The time piece shown in Koehler Patent 2,662,366 utilizes a balance staff which carries a balance wheel and a magnetic bar rotor which oscillates between the poles of an electromagnet. The balance wheel is supported from the staff by means of a conventional cross-arm.

In the device of the present invention it is necessary to secure at least one end of the spring member to a support carried by the balance staff and this support may comprise either the cross-arm of the balance wheel or the magnetic bar rotor. The embodiments of the invention will now be described in terms of supporting the indexing spring from the bar rotor but it will be understood that the balance wheel or any other support fixed to the balance staff may be used.

Figure 1:
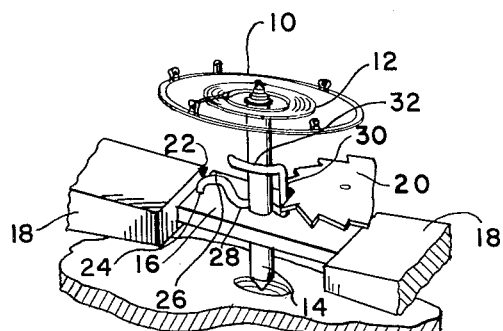
FIGURE 1 is a perspective view of the balance wheel in a battery driven time piece showing one form of an indexing spring constructed according to the invention in engagement with an indexing gear.

Referring now to FIGURE 1, a balance wheel 10 carries a hairspring 12 and is mounted on a balance staff 14 in the manner shown in the Koehler patents. A magnetic bar rotor 16 is mounted for oscillation on the balance staff 14 and oscillates between a pair of pole pieces 18 of an electromagnet. A toothed indexing gear 20 cooperates with a spring wire indicated generally at 22 to provide incremental motion to the hands of a watch as described in Koehler Patent No. 2,662,366.

The spring wire 22 is attached at 24 to the magnetic bar rotor 16. Spring wire 22 is provided with a first looped portion 26 and a second looped portion 28 extending around the balance staff 14. The spring wire 22 continues with a vertically extending contact portion 30 which parallels the the balance staff 14 and terminates in a straight guide portion 32 which contacts the balance staff 14 and is guided thereby. The contact portion 30 of the spring wire 22 contacts the teeth of the indexing gear 20 to drive the gear in the following manner.

When the balance staff 14 rotates in a counterclockwise direction the contact portion 30 of the spring wire 22 engages the straight side of the adjacent tooth on the index gear 20. Loop 28 engages balance staff 14 and prevents movement of the spring in that direction so that the continued rotation of the balance staff drives the index gear 20 forward one tooth. As the balance staff returns in a clockwise direction the index gear 20 is held in position by a detent, not shown, and the resiliency of loop 26 permits contact portion 30 to ride up and over the tooth. As the loop 26 is flexed the loop 28 tends to move away from the balance staff but is held in position by guide portion 32 which slides along the balance staff 14.

Figure 2:
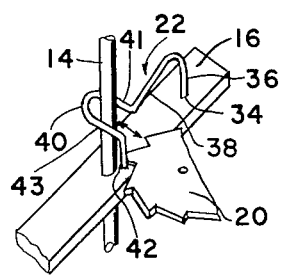
FIGURE 2 is a partial perspective view showing another form of an indexing spring constructed according to the present invention.

Referring now to FIGURE 2, a modification of the spring wire 22 is shown for use in a situation where weight positioning in an uprighted movement is important, such as is required for a desk clock or an automobile clock. The indexing gear 20 is substantially at right angles to the neutral position of the magnetic bar rotor 16 from that shown for the indexing gear in FIGURE 1. The spring wire 22 is suitably attached to the magnetic bar rotor 16 at 34 and is provided with an upstanding portion 36 followed by a portion 38 directed toward the balance staff 14 and a looped portion 40 around the balance staff 14. The looped portion 40 has two straight sides 41 and 43 which serve as guides. Spring wire 22 continues with a downwardly extending contact portion 42 for engagement with the indexing gear 20. In this embodiment, the reciprocation of the spring wire 22 is substantially at right angles with the longitudinal axis of the rotor 16 as indicated by the twin arrows.

In the operation of the embodiment shown in FIGURE 2, when the balance staff 14 rotates in a counterclockwise direction, the contact portion 42 of the spring wire engages the straight side of the adjacent tooth of the index gear 20. The guide side 41 of loop 40 contacts the balance staff 14 and limits movement of the spring away from the attachment 34 so that the index gear 20 is driven forward one tooth. As the balance staff returns in a clockwise direction the index gear 20 is held in position by a detent, not shown, and the resiliency of portion 38 permits contact portion 42 to ride up and over the tooth with the guide portions 41 and 43 directing the movement.

Figure 3:
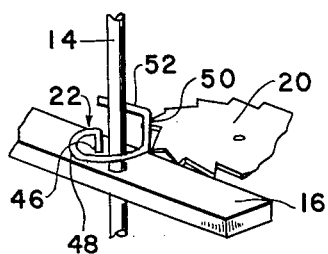
FIGURE 3 is a partial perspective view showing another form of an indexing spring constructed according to the present invention.

Referring now to FIGURE 3, another embodiment of the present invention is shown which provides for better weight distribution. This is accomplished by anchoring a spring wire 22 at 46 closer to the balance staff than in the previously described embodiments. A looped portion 48 extends directly around the balance staff 14 and the spring continues with a vertically extending contact portion 50 and terminates in a straight guide portion 52 which contacts the balance staff 14. The looped portion 48 provides the necessary resiliency to permit the spring to flex radially towards the balance staff 14 in response to engagement with the teeth of the indexing gear 20.

In the operation of the embodiment shown in FIGURE 3, when the balance staff 14 rotates in a counterclockwise direction the contact portion 50 engages the straight side of the adjacent tooth on the index gear 20. Straight portion 52 engages balance staff 14 and limits movement of the spring in that direction so that continued rotation of the balance staff drives the index gear 20 clockwise one tooth. As the balance staff 14 returns in a clockwise direction, the index gear 20 is restrained from rotating counterclockwise by a detent, not shown, and the resiliency of the loop 48 permits contact portion 50 to ride up and over the next tooth. As the loop 48 is flexed it is guided by guide portion 52 which slides along the balance staff 14.

Figure 4:
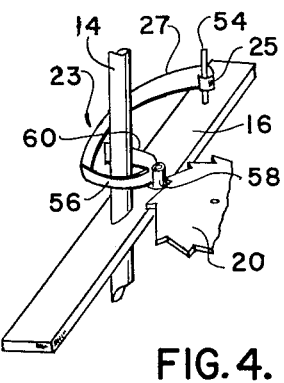
FIGURE 4 is a partial perspective view showing another form of an indexing spring constructed according to the present invention.

Although round wire is preferred for the spring member 22, primarily because of its low cost, a flat spring may also be used. Referring now to FIGURE 4, a flat spring indicated generally at 23 is illustrated in another embodiment of the present invention. One end 25 of the flat spring 23 is wrapped around and secured to a pin 54 in the magnetic bar rotor 16. The flat spring 23 extends from this pin in an elongated portion 27 and is provided with a looped portion 56 which has a jewel 58 attached thereto so as to be engageable with the teeth of the indexing wheel 20. A straight guide portion 60 of the flat spring 23 engages the balance staff 14 to guide the spring in its reciprocation. The jewel 58 provides better wearing characteristics but increases the cost so that this embodiment is intended for use primarily in quality clocks.

In the operation of the embodiment shown in FIGURE 4, when the balance staff 14 rotates in a counterclockwise direction the jewel 58 engages the straight side of the adjacent tooth on the index wheel 20. Guide portion 60 engages balance staff 14 and limits the movement of the spring in that direction so that continued rotation of the balance staff 14 drives the index gear 20 forward one tooth. As the balance staff returns in a clockwise direction, the index gear 20 is held in position by a detent, not shown, and the resiliency of portion 27 permits jewel 58 to ride up and over the next adjacent tooth.

Figure 5:
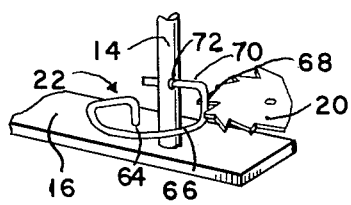
FIGURE 5 is a partial perspective view showing still another form of an indexing spring constructed according to the present invention.

Reference is now made to FIGURE 5 which shows still another embodiment of the present invention. Referring to that figure, spring 22 is attached at 64 to the magnetic bar rotor 16 and is provided with a looped portion 66 followed by a vertically upstanding portion 68 adapted to contact the indexing wheel 20. The balance staff 14 is provided with a bore 72 through which a straight guide portion 70 of the spring member 22 is inserted.

In the operation of the embodiment shown in FIGURE 5, when the balance staff 14 rotates in a counterclockwise direction, the contact portion 68 engages the straight side of the adjacent tooth on the index gear 20. Loop 66 is maintained at a preset distance from the balance staff 14 by guide portion 70 in hole 72 and the continued rotation of the balance staff drives the index gear 20 forward one tooth. As the balance staff returns in a clockwise direction, the index gear 20 is held in position by a detent, not shown, and the resiliency of the loop 66 permits contact portion 68 to ride up and over the next adjacent tooth. As the loop 66 is flexed straight guide portion 70 slides within bore 72.

It will be apparent that by the use of a suitably shaped elongated spring member retained in the magnetic bar rotor and guided by the balance staff 14 that the present invention eliminates the need for retaining washers and a coil spring to transmit the oscillatory movement of the balance staff into intermittent rotary motion of the indexing gear. As a result, a substantial saving is effected in both labor and material cost. As was mentioned previously, although the spring member has been described as being secured in the magnetic bar rotor, the balance wheel or any other support fixed to the balance staff may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a horological device having an oscillating balance staff driving a toothed indexing gear, a support member fixed to said balance staff, a unitary resilient spring mounted in said support member, said spring having a contact portion positioned to engage the nearest tooth of said indexing gear as said balance staff oscillates, said spring having a resilient portion connecting said contact portion to the portion of said spring mounted in said support member to permit said contact portion to resiliently move substantially radially of said balance staff, and said spring further having a substantially straight portion engageable with said balance staff for guiding the movement of said contact portion as it moves moves substantially radially.

2. In a horological device having a magnetically impulsed balancing staff, the combination comprising a balance staff, a rotor mounted on said balance staff, spring means attached at one end to said rotor, said spring means having a contact portion and a looped portion, an indexing wheel, said indexing wheel being positioned to be engaged by said contact portion as said contact portion is moved radially with respect to said balance staff, said looped portion being located between said contact portion and said end attached to said rotor.

3. The apparatus of claim 2 wherein said spring means comprises an elongated spring member.

4. In a horological device as described in claim 3 wherein said elongated spring member is further provided with another portion in contact with and guided by said balance staff.

5. In a horological device as described in claim 3 wherein said looped portion of said elongated spring member forms an arc of approximately 180 degrees around said balance staff.

6. In a horological device as described in claim 3 wherein one end of said elongated spring member fixed to said rotor constitutes one end of said looped portion, said elongated spring member further comprising a second looped portion around said balance staff, said contact portion extending upwardly from said second looped portion, and another portion in contact with said balance staff displaced vertically and radially opposite said second looped portion.

7. In a horological device as described in claim 3 wherein said elongated spring comprises a first portion extending from said attachment of said one end in said rotor substantially perpendicular to said rotor, a second portion substantially parallel to the longitudinal axis of said rotor, said looped portion extending around said balance staff in an arc of approximately 180 degrees, said contact portion extending downwardly from said looped portion and a third portion contacting said balance staff in a position radially adjacent said first portion.

8. In a horological device as described in claim 3 wherein said elongated spring comprises a first portion extending from said attachment of said one end in said rotor substantially perpendicular to said rotor, said looped portion extending around said balance staff in an arc of approximately 180 degrees, said contact portion extending upwardly from said looped portion, and another portion contacting said balance staff and displaced vertically and radially opposite said looped portion.

9. In a horological device having a magnetically impulsed balancing staff, the combination comprising a balance staff, a rotor mounted on said balance staff, spring means attached at one end to said rotor, said spring means having a contact portion substantially parallel to the longitudinal axis of said balance staff, an indexing wheel positioned to be engaged by said contact portion in a ratchet type manner as said contact portion of said spring means is moved radially with respect to said balance staff, said spring means further provided with a looped portion between said contact portion and the end of said spring means attached to said rotor.

10. In a horological device as described in claim 9 wherein said elongated spring means comprises a flat spring.

11. In a horological device as described in claim 10 wherein a jewel is mounted on said flat spring to provide said contact portion for engaging said indexing wheel.

12. In a horological device as described in claim 1 wherein said balance staff is provided with an opening to receive and guide the other end of said elongated spring member.

13. In a horological device having an oscillating balance staff driving a toothed indexing gear, a support member fixed to said balance staff, a unitary resilient spring member fixed at one end with respect to said support member, said spring member having a contact portion positioned to engage the nearest tooth of said indexing gear as said balance staff oscillates, said spring member having a resilient portion intermediate said contact portion and said end fixed with respect to said support member to permit said contact portion to resiliently move substantially radially of said balance staff, and said spring member further having a substantially straight portion engageable with said balance staff for guiding the movement of said contact portion as it moves substantially radially.

References Cited in the file of this patent

UNITED STATES PATENTS

| | | |
|---|---|---|
| 2,079,421 | Poole | May 4, 1937 |
| 2,572,989 | Contant et al. | Oct. 30, 1951 |
| 2,662,366 | Koehler | Dec. 15, 1953 |
| 2,777,279 | Koehler | Jan. 15, 1957 |

FOREIGN PATENTS

| | | |
|---|---|---|
| 855,412 | France | Feb. 12, 1940 |